(12) United States Patent
Wang et al.

(10) Patent No.: US 11,106,006 B2
(45) Date of Patent: Aug. 31, 2021

(54) LENS ASSEMBLY, CAMERA MODULE AND METHOD FOR ASSEMBLING SAME

(71) Applicant: Ningbo Sunny Opotech Co., Ltd., Ningbo (CN)

(72) Inventors: Mingzhu Wang, Ningbo (CN); Lifeng Yao, Ningbo (CN); Nan Guo, Ningbo (CN)

(73) Assignee: Ningbo Sunny Opotech Co., Ltd.

( * ) Notice: Subject to any disclaimer, the term of this patent is extended or adjusted under 35 U.S.C. 154(b) by 322 days.

(21) Appl. No.: 16/101,016

(22) Filed: Aug. 10, 2018

(65) Prior Publication Data

US 2019/0049693 A1 Feb. 14, 2019

(30) Foreign Application Priority Data

Aug. 11, 2017 (CN) .......................... 201710687361.1

(51) Int. Cl.
*G02B 7/02* (2021.01)
*G02B 9/04* (2006.01)
*G02B 13/00* (2006.01)

(52) U.S. Cl.
CPC ............... *G02B 9/04* (2013.01); *G02B 7/021* (2013.01); *G02B 7/023* (2013.01); *G02B 7/025* (2013.01); *G02B 13/001* (2013.01)

(58) Field of Classification Search
CPC . G02B 9/04; G02B 7/023; G02B 7/25; G02B 13/001; H04N 5/2254
See application file for complete search history.

(56) References Cited

U.S. PATENT DOCUMENTS

2018/0115689 A1* 4/2018 Lin ...................... G02B 27/646

FOREIGN PATENT DOCUMENTS

| JP | 2013200459 | 10/2013 |
| JP | 2016197661 | 11/2016 |
| JP | 2017017480 | 1/2017 |
| WO | 2015076056 | 5/2015 |
| WO | 2017092659 A1 | 6/2017 |
| WO | 2017101854 A1 | 6/2017 |

OTHER PUBLICATIONS

Extended European Search Report, European Application No. 18845018.3-1020, dated Jul. 10, 2020, 6 pages.

* cited by examiner

*Primary Examiner* — Ephrem Z Mebrahtu
(74) *Attorney, Agent, or Firm* — Barnes & Thornburg LLP

(57) ABSTRACT

The present disclosure discloses a lens assembly, a camera module, and a method for assembling the same. An embodiment of the method for assembling a lens assembly includes: preparing a first lens subassembly and a second lens subassembly, the first lens subassembly including a first lens cylinder and a first lens, and the second lens subassembly including a second lens cylinder and a second lens; arranging the first lens subassembly on an optical axis of the second lens subassembly to form an imaging optical system comprising the first lens and the second lens; moving the first and the second lens subassemblies relatively along the optical axis, and matching an actually measured image plane of the optical system and a target plane; and connecting the first and the second lens subassemblies to fix a relative distance between the first and the second lens subassemblies along the optical axis.

11 Claims, 8 Drawing Sheets

LENS ASSEMBLY, CAMERA MODULE AND METHOD FOR ASSEMBLING SAME

CROSS-REFERENCE TO RELATED APPLICATIONS

This application claims priority to Chinese Patent Application No. 201710687361.1, filed with the State Intellectual Property Office of the People's Republic of China (SIPO) on Aug. 11, 2017, the content of which is incorporated herein by reference in its entirety.

TECHNICAL FIELD

The present disclosure relates to the technical field of optics, and specifically relates to a solution to a lens assembly and a camera module.

BACKGROUND

With the popularization of mobile electronic devices, a relative technology of a camera module applied to the mobile electronic devices and used for helping users to obtain an image (such as a video or a photo) has been rapidly developed and progressed. In recent years, the camera module has been widely used in many fields such as medical treatment, security, and industrial production.

In order to meet increasingly extensive market demands, higher resolution, smaller size, and larger aperture are certain trends in the development of existing camera modules. Increasing demands for imaging quality of the camera module comes from the market. Factors influencing resolving power of an established camera module with an optical design include quality of a lens assembly, and manufacturing errors in a packaging process of the module. Both field curvature of the lens assembly and the field curvature formed by the manufacturing errors during packaging of the module will influence the resolving power of the camera module. In the industry, there is no effective solution to the problem of field curvature.

The field curvature is also called "curvature of an image field." When a lens has field curvature, an intersection point of the whole beam of light does not coincide with the ideal image point. Although a sharp image can be obtained at every particular point, the whole image plane is a curved plane. When a photosensitive element has a flat surface, a curved image plane cannot coincide with a photosensitive surface of the photosensitive element, so that when center fields of view coincide, the center field of view has high resolving power and clear imaging. However, a peripheral field of view with field curvature cannot coincide with the photosensitive surface of the photosensitive element due to a curved image plane, resulting in low resolving power, and decreased imaging quality. Contrariwise, when the peripheral field of view with the field curvature coincides with the photosensitive surface of the photosensitive element, the peripheral field of view has high resolving power and clear imaging. However, since the center field of view cannot coincide with the photosensitive surface of the photosensitive element, the resolving power is low, and the imaging quality is decreased. Even if the photosensitive element does not have a flat surface, as long as the curvature of the imaging plane of the lens assembly does not match the curvature of the photosensitive surface of the photosensitive element, a relative difference, i.e., field curvature, between the two curvatures exists, and an influence on image quality caused by the field curvature is identical to that in the above situation.

Therefore, the influence of the field curvature makes the imaging plane of the lens unable to match the photosensitive surface of the photosensitive element well, resulting in a decrease of the quality of an image formed by the photosensitive element relative to the optimal imaging quality.

The field curvature of the camera module is generated in a manufacturing process of a lens assembly and in a packaging process of the module. The field curvature produced in any process, which is not eliminated, can lead to a decrease of the imaging quality, and the field curvature produced in the two processes is superposed and deteriorated, so that a process for seeking a solution cannot be considered in isolation. However, in the current industry chain, the manufacturing process of the lens assembly is separated from the module packaging process. This situation is inconsistent with that the field curvature produced in the two processes should not be solved in isolation.

Hereinafter, an existing field curvature solution and a current situation will be discussed for the above two processes, respectively:

(A) (1) For an integrated lens of a traditional lens assembly, a plurality of lenses are fixed in a lens cylinder sequentially. Once the lenses are mounted in the lens cylinder, the positions thereof cannot be adjusted, the overall performance of the lens assembly is determined, and the control of the imaging quality can only be achieved by controlling the component tolerance. (2) For a split lens of the traditional lens assembly, a plurality of lens units are seamlessly and tightly supported on a mounting surface in order to get a movement benchmark; and the mounting surface is parallel to the imaging plane, so that the adjustment brought by the movement of the mounting surface can only be the adjustment along the supported mounting surface and parallel to the imaging surface. The problem of field curvature cannot be solved.

In the manufacturing process of the lens assembly, the field curvature comes from: errors of elements and assembly thereof, including the errors in the aspects of a thickness of an optical surface of each lens, a sagittal height of the optical surface, and a radius of curvature of a surface type of the optical surface, etc., which depend on precision of a mold and ability to control the forming precision; thickness of a lens spacer element, which depends on machining precision of the elements; assembly of lenses, which depends on a dimensional tolerance of assembled elements and assembling precision of the lenses; and changes of the refractive index of a lens material, which depend on stability of the material and consistency of batches. Moreover, the error of each element influencing the field curvature has cumulative deterioration phenomena, and the cumulated error increases as the number of lenses increases. An existing field curvature solution includes performing batch control and matching on sizes of the elements with high relative sensitivity to the field curvature, thereby reducing the field curvature. However, since it is batch-level fixed-value adjustment, adjustable variables are less, the adjusted elements are simple and limited to the structure of single lens cylinder, the freedom of adjustment is low, the feedback cycle is long, and only a central value of field curvature distribution of a large quantities of products is adjusted without convergence of the width of the field curvature distribution. That is to say, a process capability index (CPK) of field curvature cannot be improved, and CPK of the field curvature is low and is subject to great fluctuation, so that the rejection rate of the resolving power caused by the field curvature is high. In addition, as mentioned above, since so many factors that affect the field curvature exist in a plurality of elements, the control of each factor is subject to the manufacturing precision limit. If only the precision of each element is enhanced, the enhancing capacity is limited, the enhancing cost is high, and the residual field curvature cannot meet the increasing demand for imaging quality from the market. In some situations, the field curvature distribution of an existing lens assembly is basically +/−10 μm, preferably +/−7 μm, and the distribution range will reach +/−15 μm under the condition that element parts and the assembly precision are not controlled well. However, the market demand for the imaging quality requires the field curvature distribution to be less than +/−5 μm.

(B) In the packaging and manufacturing process of the camera module, the field curvature comes from the curvature difference between curvature of the photosensitive surface of the photosensitive element and the target image plane. The curvature difference sources from: the thickness of the photosensitive element, and the thickness and planeness of a circuit substrate, which depend on manufacturing capability of an element, limitations of dimensional miniaturization and structural strength of a module; the thickness, uniformity, and thermal expansion coefficient of a bonding material for gluing the photosensitive elements, which depend on material characteristics and the attachment process; the thickness, uniformity, and refractive index of an attached transparent optical element, which depend on material characteristics and machining precision; and stress deformation caused by contraction of a packaging material, which depends on material characteristics, and limitations of dimensional miniaturization and structural strength of the module. An existing field curvature solution includes enhancing the structural strength of the elements mentioned above, and reducing the deformation of contraction. In fact, the solutions cannot effectively solve the abovementioned problems. Because so many factors that affect the field curvature exist in a plurality of elements, the control of each factor is subject to the manufacturing precision limit. If only the strength of each element is enhanced, the enhancing capability is limited, the enhancing cost is high, and the residual field curvature cannot meet the increasing demand for imaging quality from the market. In some situations, the field curvature of an existing camera module fluctuates greatly, and the distribution thereof is basically +/−12 μm, preferably +/−8 μm, and the distribution range will reach +/−17 μm under the condition that element parts and the assembly precision are not controlled well. However, the market demand for the imaging quality requires the field curvature distribution to be less than +/−5 μm.

SUMMARY

The present disclosure provides a lens assembly, a camera module, and a method for assembling the same in order to solve at least one problem in the existing technology.

According to an aspect, the present disclosure provides a method for assembling a lens assembly. The method includes: preparing a first lens subassembly and a second lens subassembly, the first lens subassembly comprising a first lens cylinder and a first lens, and the second lens subassembly comprising a second lens cylinder and a second lens; arranging the first lens subassembly on an optical axis of the second lens subassembly to form an imaging optical system comprising the first lens and the second lens; moving the first lens subassembly and the second lens subassembly relatively along the optical axis, and matching an actually measured image plane of the optical system and a target plane; and connecting the first lens subassembly and the second lens subassembly to fix a relative distance between the first lens subassembly and the second lens subassembly along the optical axis.

According to an implementation of the present disclosure, the moving the first lens subassembly and the second lens subassembly relatively along the optical axis, and matching an actually measured image plane of the optical system and a target plane includes: moving the first lens subassembly and the second lens subassembly relatively along the optical axis, acquiring an actually measured field curvature of the optical system at an actually measured position, and matching the actually measured field curvature and a target field curvature.

According to an implementation of the present disclosure, the actually measured field curvature is an axial deviation of the actually measured image plane at a test field of view relative to the actually measured image plane at a reference field of view.

According to an implementation of the present disclosure, the target field curvature is an axial deviation of the target plane at the test field of view relative to the target plane at the reference field of view.

According to an implementation of the present disclosure, the matching the actually measured image plane and the target plane includes: making a difference between the actually measured field curvature and the target field curvature be in range of +/−5 μm.

According to an implementation of the present disclosure, the target plane is a flat plane, a convex plane, a concave plane, or a wavy plane.

According to an implementation of the present disclosure, the method further includes: selecting at least one field of view as the test field of view.

According to an implementation of the present disclosure, the test field of view is in range of a 40% field of view to an 85% field of view.

According to an implementation of the present disclosure, the matching the actually measured image plane and the target plane includes: selecting 2-10 fields of view as the test field of view, and making a difference between the actually measured field curvature and the target field curvature at each of the selected fields of view be in range of +/−5 μm.

According to an implementation of the present disclosure, the matching the actually measured image plane and the target plane includes: controlling convergence of the actually measured field curvature in at least one of a sagittal direction or a tangential direction to be within +/−5 μm.

According to an implementation of the present disclosure, the matching the actually measured image plane and the target plane includes: moving the first lens subassembly and the second lens subassembly relatively along the optical axis and stopping at the actually measured position; acquiring the actually measured field curvature of the optical system at the actually measured position; and determining whether the actually measured field curvature at the current actually measured position matches the target field curvature, if yes, proceeding to the connecting the first lens subassembly and the second lens subassembly, and if not, repeating the moving the first lens subassembly and the second lens subassembly relatively along the optical axis, and the acquiring the actually measured field curvature of the optical system until the actually measured field curvature at the current actually measured position matches the target field curvature.

According to an implementation of the present disclosure, before the moving the first lens subassembly and the second lens subassembly relatively along the optical axis, the method further includes: moving an object side target or an image side target along the optical axis to enable a clear imaging of the optical system.

According to an implementation of the present disclosure, the connecting the first lens subassembly and the second lens subassembly is performed by bonding or welding, and the welding includes laser welding or ultrasonic welding.

According to another aspect, the present disclosure provides a lens assembly. The lens assembly includes: a first lens subassembly, the first lens subassembly comprising a first lens cylinder and a first lens; a second lens subassembly, the second lens subassembly comprising a second lens cylinder and a second lens; the first lens subassembly being disposed on an optical axis of the second lens subassembly to form an imaging optical system comprising the first lens and the second lens; and the first lens subassembly and the second lens subassembly being fixed together and a structural gap being formed between the first lens subassembly and the second lens subassembly, the structural gap having a dimension value along the optical axis enabling an image plane of the optical system to match a target plane.

According to an implementation of the present disclosure, each of the first lens subassembly and the second lens subassembly has an optical surface belonging to the optical system and a structural surface beyond the optical surface, and the structural gap is a gap between the structural surface of the first lens subassembly and the structural surface of the second lens subassembly.

According to an implementation of the present disclosure, the first lens subassembly is provided with a first structural surface closest to the second lens subassembly along the optical axis and positioned within a projected area of the second lens subassembly along the optical axis, the second lens subassembly is provided with a second structural surface closest to the first lens subassembly along the optical axis and positioned within a projected area of the first lens subassembly along the optical axis, and the structural gap is an average structural gap along the optical axis between the first structural surface and the second structural surface.

According to an implementation of the present disclosure, a dimension value of the structural gap along the optical axis is less than 500 µm.

According to an implementation of the present disclosure, the first structural surface is positioned on the first lens cylinder or the first lens; or positioned on a first lens structural accessory, the first lens structural accessory includes a first spacer ring mounted on the first lens cylinder; or positioned on a bonding material for bonding the first spacer ring to the first lens cylinder or the first lens; or positioned on a bonding material for bonding the first lens to the first lens cylinder.

According to an implementation of the present disclosure, the second structural surface is positioned on the second lens cylinder or the second lens; or positioned on a second lens structural accessory, the second lens structural accessory includes a second spacer ring mounted on the second lens cylinder; or positioned on a bonding material for bonding the second spacer ring to the second lens cylinder or the second lens; or positioned on a bonding material for bonding the second lens to the second lens cylinder.

According to an implementation of the present disclosure, the first lens subassembly and the second lens subassembly are fixed together by bonding or welding, and the welding includes laser welding or ultrasonic welding.

According to another aspect, the present disclosure provides a lens assembly assembled by the above described method for assembling a lens assembly, where a structural gap is formed between the first lens subassembly and the second lens subassembly of the lens assembly; among a plurality of the lens assemblies with an identical design, there are at least a first lens assembly and a second lens assembly, and a dimension value of the structural gap of the first lens assembly along an optical axis and a dimension value of the structural gap of the second lens assembly along the optical axis have a difference of 2-60 µm.

According to an implementation of the present disclosure, each of the first lens subassembly and the second lens subassembly has an optical surface belonging to the optical system and a structural surface beyond the optical surface, and the structural gap is a gap between the structural surface of the first lens subassembly and the structural surface of the second lens subassembly.

According to an implementation of the present disclosure, the first lens subassembly is provided with a first structural surface closest to the second lens subassembly along the optical axis and positioned within a projected area of the second lens subassembly along the optical axis, the second lens subassembly is provided with a second structural surface closest to the first lens subassembly along the optical axis and positioned within a projected area of the first lens subassembly along the optical axis, the structural gap is an average structural gap along the optical axis between the first structural surface and the second structural surface.

Compared with the prior art, the present disclosure has at least one of the following technical effects.

1. According to some embodiments of the present disclosure, by adjusting the axial distance between two lens subassemblies in the process of assembling a split lens assembly and the corresponding camera module, the field curvature of the assembled lens assembly and the assembled corresponding camera module is effectively reduced.

2. According to some embodiments of the present disclosure, the field curvature distribution of the lens assembly or the camera module produced in enormous quantities can be converged, and the process capability index (CPK) can be improved.

3. According to some embodiments of the present disclosure, the field curvature of the lens assembly or the camera module can be adjusted in real time in an assembly process, so that the field curvature fluctuation is reduced, the rejection rate caused by the field curvature is reduced, the production cost is reduced, and the imaging quality is improved.

4. According to some embodiments of the present disclosure, the requirements on the precision of elements' dimensions and the assembly precision of the lens assembly and the module can be loosened, thereby reducing the overall cost of the lens assembly and the module.

5. According to some embodiments of the present disclosure, by setting a structural gap, limiting the range of a plurality of the structural gaps to be preferably less than 500 µm, and providing a space for multi-axis adjustment among a plurality of lens units, the multi-axis adjustment becomes possible.

6. According to some embodiments of the present disclosure, by setting a structural gap, limiting the difference range of the structural gap of the split type lens assembly and the camera module thereof to be 2-50 µm, preferably 2-20 µm, and converting the difference of the field curvature of the lens assembly and the module thereof into the difference of the structural gap by using the structural gap to perform adjustment offset, the consistency of the field curvature of products produced in enormous quantities is improved.

BRIEF DESCRIPTION OF THE DRAWINGS

Illustrative embodiments are shown in the accompanying drawings. The embodiments and accompanying drawings of the present disclosure should be regarded as illustrative instead of restrictive.

DETAILED DESCRIPTION OF EMBODIMENTS

Figure 1:
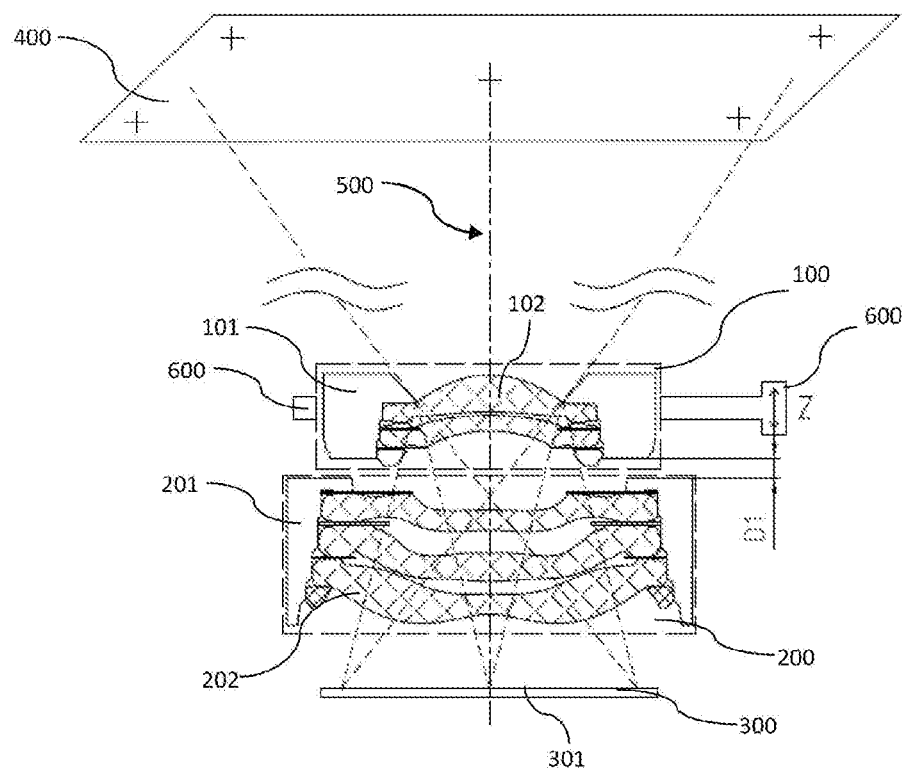
FIG. 1 shows a schematic diagram of an embodiment of a method for assembling a lens assembly provided by the present disclosure.

In order to better understand the present disclosure, all aspects of the present disclosure will be described in more detail with reference to the accompanying drawings. It should be understood that these detailed descriptions are merely used for describing illustrative implementations of the present disclosure, rather than limiting the scope of the present disclosure in any way. In the full text of the specification, identical drawing numbers refer to identical elements. The statement "and/or" includes any and all combinations of one or more of items listed in association.

It should be noted that the statements such as "first" and "second" in the specification are used only to distinguish one characteristic from another, without indicating any restriction on the characteristics. Thus, without departing from the instruction of the present disclosure, a first subject discussed below may also be called a second subject.

In the accompanying drawings, for the purpose of illustration, the thickness, size, and shape of an object have been slightly exaggerated. The accompanying drawings are merely illustrative and not strictly drawn to scale.

It should also be understood that the terms "include," "comprise," and "have," when used in the specification, indicate the existence of the stated characteristics, entireties, steps, operations, elements, and components, but do not exclude the existence or addition of one or more other characteristics, entireties, steps, operations, elements, components, or combinations of them. In addition, when a statement such as "at least one of . . . " appears before a list of the characteristics, it modifies the whole list rather than an individual element in the list. In addition, "an embodiment" of the present disclosure means "one or more embodiment" of the present disclosure. Moreover, the term "illustrative" is intended to refer to an example or an illustration.

For example, the terms "essentially," "about," and similar terms used in the present disclosure are used as terms expressing approximation, but not as terms expressing degrees, and are used to indicate an inherent deviation in a measured value or a calculated value, which will be appreciated by those of ordinary skill in the art.

Unless otherwise specified, all the terms (including technical terms and scientific terms) used in the present disclosure have the same meanings as those understood by those of ordinary skill in the art of the present disclosure. It should also be understood that terms (such as those defined in a common dictionary) should be interpreted as consistent with the meanings in contexts of their related technologies, and will not be in idealized or overly formal interpretation, unless otherwise specified in the present disclosure.

It should be noted that some embodiments in the present disclosure and some characteristics in some embodiments can be combined with each other, unless they conflict with each other. Hereinafter, the present disclosure will be described in detail with reference to the accompanying drawings in combination with the embodiments.

FIG. 1 shows a schematic diagram of an embodiment of a method for assembling a lens assembly provided by the present disclosure. Referring to FIG. 1, the method for assembling the lens assembly includes steps 1-4 as follows.

Step 1: preparing a first lens subassembly 100 and a second lens subassembly 200. The first lens subassembly 100 includes a first lens cylinder 101 and a first lens 102 mounted in the first lens cylinder 101. The number of the first lens 102 in some embodiments is two, but it should be noted that the present disclosure is not limited by this number. For example, in some embodiments, the number of the first lens 102 may also be one, three, four, etc. The second lens subassembly 200 includes a second lens cylinder 201 and a second lens 202 mounted in the second lens cylinder 201. The number of the second lens 202 in some embodiments is three, but it should be noted that the present disclosure is not limited by this number. For example, in some embodiments, the number of the second lens 202 may also be one, two, four, etc.

Step 2: arranging the first lens subassembly 100 on an optical axis 500 of the second lens subassembly 200 to form an imaging optical system including the first lens 102 and the second lens 202. In some embodiments, the optical system includes one object side target 400, two first lenses 102, three second lenses 202, and one image side target 300. In some embodiments, the image side target 300 may be an optical detector for testing, and the optical detector has an optical detection surface 301. The optical detector includes a photosensitive element for testing. In some situations, the photosensitive surface of the optical detector is the optical detection surface 301. By utilizing the optical detection surface 301, an image plane of the optical system can be detected. It should be noted that the lens assembly is usually assembled with other elements such as a photosensitive element to form a camera module. However, in the optical system constructed during this step in this disclosure, the image side target 300 is only a target for testing, not a photosensitive module element in the camera module actually corresponding to the lens assembly.

The image side target 300 may also be a target of another type, such as a reticle and the like. When the image side target 300 is a reticle, the optical detector may be used as the object side target. Because an optical path is reversible, the image plane of the optical system may also be detected according to this varied scheme.

Step 3: moving the first lens subassembly 100 and the second lens subassembly 200 relatively along the optical axis 500 to match an actually measured image plane and a target plane.

An expected imaging plane will be provided for an assembled lens assembly, and is known as the target plane in this disclosure. In some cases, the target plane is a flat plane. For example, if the photosensitive surface of the photosensitive element of the camera module corresponding to the lens assembly is a flat plane, the expected imaging plane of the lens assembly is also a flat plane, in order to achieve the optimal imaging quality. In other words, the target plane is a flat plane in some situations. In some other cases, the target plane may also be a convex plane, a concave plane, or a wavy plane. For example, if the photosensitive surface of the photosensitive element of the camera module corresponding to the lens assembly is a convex plane or a concave plane, the target plane should also be a convex plane or a concave plane, in order to achieve the optimal imaging quality. In addition, if the photosensitive surface of the photosensitive element of the camera module corresponding to the lens assembly is a wavy plane, the target plane should also be a wavy plane.

Figure 2A:
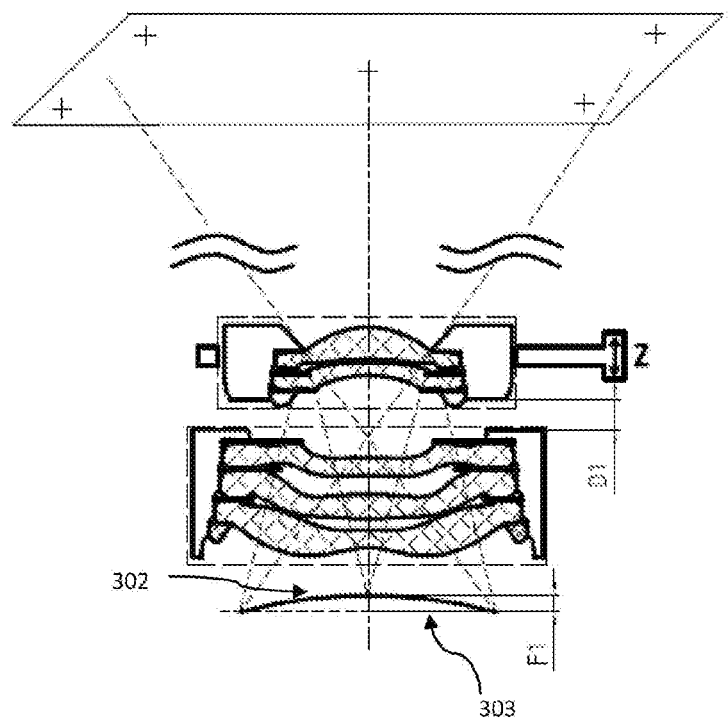
FIG. 2a shows a situation that an actually measured image plane does not match a target plane when the axial distance between a first lens subassembly 100 and a second lens subassembly 200 is D1.
Figure 2B:
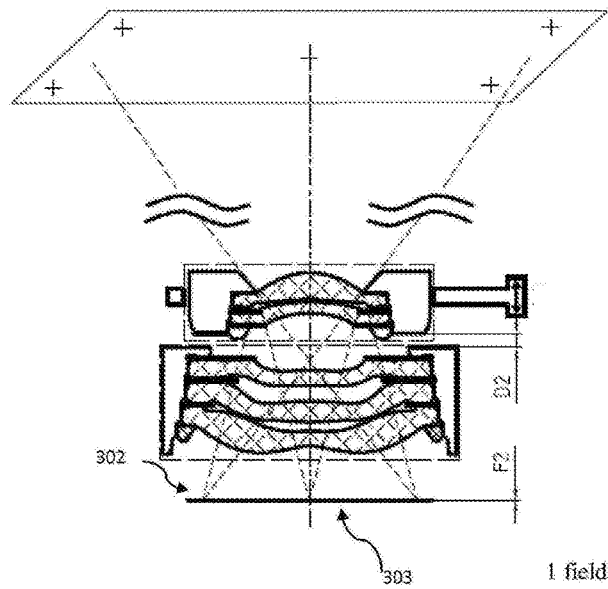
FIG. 2b shows a situation that the actually measured image plane matches the target plane when the axial distance between the first lens subassembly 100 and the second lens subassembly is D2.

FIG. 2a shows a situation that an actually measured image plane does not match the target plane when the axial distance between the first lens subassembly 100 and the second lens subassembly 200 is D1. The target plane in FIG. 2a is a flat plane, the actually measured field curvature is F1, and F1 is not zero. FIG. 2b shows a situation that the actually measured image plane matches the target plane when the axial distance between the first lens subassembly 100 and the second lens subassembly 200 is D2. Referring to FIG. 2b, it can be seen that the actually measured image plane coincides with the target plane, and the actually measured field curvature F2 is zero.

Figure 3:
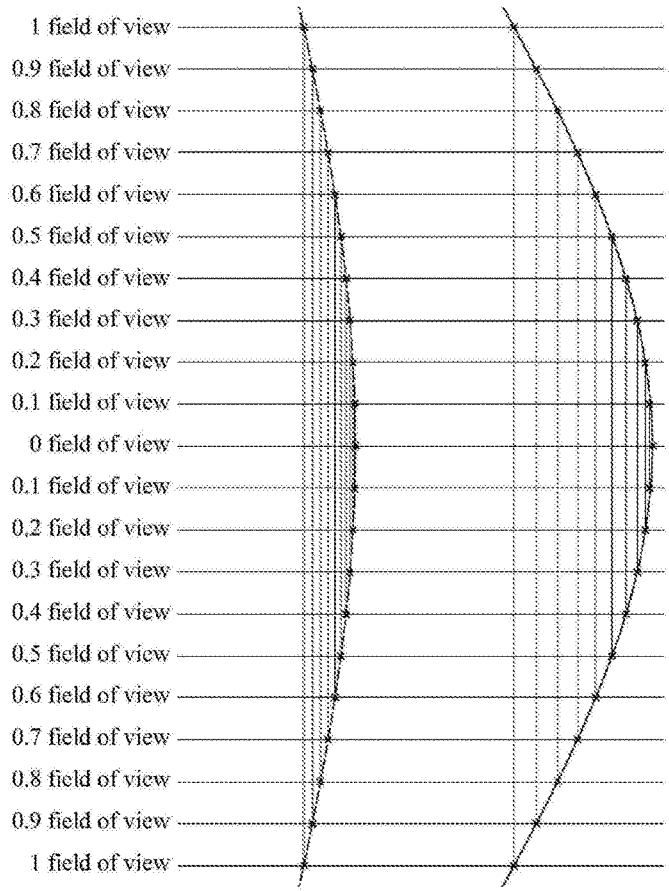
FIG. 3 shows a schematic diagram of the corresponding relationship between the target plane and a plurality of fields of view, and a schematic diagram of the corresponding relationship between an actually measured image plane and a plurality of fields of view.

In some embodiments, the curvature of the target plane may be described by using a target field curvature, and the curvature of the image plane that is actually measured by using the image side target 300 in the process of assembling the lens assembly may be described by using an actually measured field curvature. When the actually measured field curvature matches the target field curvature, it can be considered that the shape of the actually measured image plane matches that of an expected image plane. In this state, better imaging quality can be obtained. When the target plane is a flat plane, the target field curvature is zero. When the target plane is a curved plane, the target field curvature is not zero. FIG. 3 shows a schematic diagram of a corresponding relationship between the target plane and the actually measured image plane, and a plurality of fields of view, wherein two curves represent the target plane and the actually measured image plane respectively, among which the dotted curve represents the target plane, and the solid curve represents the actually measured image plane. Positions corresponding to a plurality of fields of view from zero to one (a zero field of view, a 0.1 field of view, a 0.2 field of view, a 0.3 field of view, a 0.4 field of view, a 0.5 field of view, a 0.6 field of view, a 0.7 field of view, a 0.8 field of view, a 0.9 field of view and a 1 field of view included in the Fig.) are shown on the target plane and the actually measured image plane. The actually measured image plane can be obtained through the actually measured field curvature. For example, by selecting the zero field of view as a reference field of view to measure actually measured field curvature of a plurality of fields of view respectively, the axial (along the optical axis) offset of the image plane corresponding to each field of view (each field of view corresponding to one annular image plane) relative to the image plane of the zero field of view can be obtained. Based on the axial position of the annular image plane corresponding to each field of view, the shape of the whole image plane can be obtained.

Further, in some embodiments, the actually measured field curvature of the imaging of the optical system at one or more actually measured position is obtained, and whether the actually measured image plane matches the target plane is identified according to the actually measured field curvature. At least one field of view is selected as a test field of view. The actually measured field curvature corresponding to the test field of view is an axial deviation between the actually measured image plane at the test field of view and the actually measured image plane at the reference field of view (the axial direction refers to the direction along the optical axis 500). The actually measured image plane is the image plane actually received by using the image side target 300. The test field of view preferably is a field of view in range between a 40% field of view and an 85% field of view. The reference field of view may be a zero field of view (also known as a central field of view). However, it should be noted that the reference field of view of the present disclosure is not limited to the zero field of view. For example, when the target plane is a wavy plane, the field of view corresponding to the highest or lowest position of the target plane may be selected as the reference field of view. In some embodiments, the target field curvature is an axial deviation between a position, corresponding to the test field of view, of the target plane, and a position, corresponding to the reference field of view, of the target plane.

Further, in some embodiments, the matching between the actually measured image plane and the target plane includes that the difference between the actually measured field curvature and the target field curvature is within range of +/−5 μm. In other words, when the difference between the actually measured field curvature and the target field curvature is within range of +/−5 μm, it is deemed that the actually measured image plane matches the target plane. It should be noted that when the actually measured image plane and the target plane are compared, an identical test field of view and an identical reference field of view should be selected. In some embodiments, only one test field of view may be selected.

Further, in some embodiments, the number of the selected test field of view may be more than one, for example, 2-10. For each test field of view, if the difference between the actually measured field curvature and the target field curvature is with a range of +/−5 μm, it is deemed that the actually measured field curvature matches the target field curvature.

Further, in some embodiments, if the convergence of the actually measured field curvature in at least one of a sagittal direction or a tangential direction is controlled to be within +/−5 μm, it is deemed that the actually measured image plane matches the target plane.

Further, step 3 includes sub-steps as follows.

Step 31: moving the object side target or the image side target along the optical axis to ensure that clear imaging may be achieved with the optical system, i.e., focusing of the optical system is completed. The central field of view is selected for focusing in some embodiments.

Step 32: moving the first lens subassembly 100 and the second lens subassembly 200 relatively along the optical axis 500, and stop at an actually measured position. In a specific implementation, the second lens subassembly 200 may be stationary and the first lens subassembly 100 is moved along the optical axis 500; or, the first lens subassembly 100 may be stationary and the second lens subassembly 200 is moved along the optical axis 500; or, both the first lens subassembly 100 and the second lens subassembly are moved along the optical axis 500.

Referring to FIG. 1, in some embodiments, the second lens subassembly 200 is stationary, and a clamping assembly 600 is utilized to clamp the first lens subassembly 100 and is moved along the z axis (i.e., moved along the optical axis 500), thereby moving the first lens subassembly 100 and the second lens subassembly 200 relatively along the optical axis 500. In some embodiments, the clamping assembly 600 may be replaced by a sucking assembly.

Step 33: obtaining the actually measured field curvature of the imaging of the optical system at a current actually measured position. At the current actually measured position, the relative move between the first lens subassembly 100 and the second lens subassembly 200 stops. In some situations, the actually measured field curvature of the optical system is measured through the image side target 300. A corresponding resolving power defocus curve for the test field of view, which is called a test field of view defocus curve for short, can be obtained through the image side target 300. A corresponding resolving power defocus curve for the reference field of view, which is called a reference field of view defocus curve for short, can also be obtained through the image side target 300. During actual measurement, a plurality of measuring points will be taken from each test field of view. Each measuring point corresponds to one defocus curve, and the axial deviation (which is a vector) between an average value of vertex positions of defocus curves of measuring points and a vertex position of the reference field of view defocus curve (when the reference field of view is a zero field of view) is the actually measured field curvature corresponding to the test field of view. The axial deviation is the deviation along the optical axis 500. The deviation can be regarded as a deviation value of the actually measured image plane at the test field of view relative to the actually measured image plane at the reference field of view. When the reference field of view is not a zero field of view, the vertex position of the reference field of view defocus curve refers to the average value of the vertex positions of plurality of defocus curves of plurality of reference points on the reference field of view.

Step 34: judging whether the actually measured image plane at the current actually measured position matches the target plane, carrying out step 4 if the actually measured image plane at the current actually measured position matches the target plane, and continuing to carry out the sub-step 32 and the sub-step 33 if the actually measured image plane at the current actually measured position does not match the target plane until the actually measured image plane at the current actually measured position matches the target plane. The method for judging the matching between the actually measured image plane and the target plane, as mentioned above, will not be repeated here.

In some embodiments, after step 3 is completed, other adjustment steps may be optionally carried out, and then step 4 is carried out after other adjustment steps are completed.

Step 4: connecting the first lens subassembly 100 with the second lens subassembly 200 to fix the relative distance between the first lens subassembly 100 and the second lens subassembly 200 along the optical axis 500. After the connection is completed, the first lens subassembly 100 and the second lens subassembly 200 are fixed together to form a complete lens assembly.

In some embodiments, a complete lens assembly is formed by two lens subassemblies, but in some embodiments, a complete lens assembly may be formed by a greater number of lens subassemblies.

In some embodiments, the axial distance between the two lens subassemblies is adjusted in an assembly process, so that the field curvature of the assembled lens assembly is effectively reduced (or the field curvature of the lens assembly is more in line with expectations). Moreover, the assembly method provided in some embodiments can enable the field curvature distribution of the lens assembly or the camera module produced in enormous quantities to be converged, and the process capability index (CPK) to be improved. According to some embodiments, the field curvature of the lens assembly or the camera module can be adjusted in real time in an assembly process, so that the field curvature fluctuation is reduced, the rejection rate caused by the field curvature is reduced, the production cost is reduced, and the imaging quality is improved. According to some embodiments, the requirements on the precision of elements and the assembly precision of the lens assembly and the module can be loosened, thereby reducing the overall cost of the lens assembly and the module.

In the present disclosure, in the step 4, a process for connecting the first lens subassembly and the second lens subassembly may be selected according to circumstances. For example, in some embodiments, the first lens subassembly and the second lens subassembly are connected through a bonding process. In some embodiments, the first lens subassembly and the second lens subassembly are connected by laser welding. In some embodiments, the first lens subassembly and the second lens subassembly are connected through an ultrasonic welding process. In addition to the above processes, other welding processes are also available. It should be noted that the term "connection" in the present disclosure is not limited to "direct connection". For example, in some embodiments, the first lens subassembly and the second lens subassembly may be connected through an intermediate (which may be a rigid intermediate), and as long as the connection through the intermediate can fix the relative distance between the first lens subassembly 100 and the second lens subassembly 200 along the optical axis 500, it falls within the meaning of the word "connection." For example, the first lens subassembly 100 can be connected to the second lens subassembly 200 through a third lens subassembly, and in this situation, the third lens subassembly may be regarded as an intermediate.

Further, according to some embodiments of the present disclosure, a lens assembly is further provided. Still referring to FIG. 1, the lens assembly includes a first lens subassembly 100 and a second lens subassembly 200. The first lens subassembly 100 includes a first lens cylinder 101 and a first lens 102, and the second lens subassembly 200 includes a second lens cylinder 201 and a second lens 202. The first lens subassembly 100 is mounted on an optical axis 500 of the second lens subassembly 200 to form an imaging optical system including the first lens 102 and the second lens 202. In the optical system shown in FIG. 1, the number of the first lens 102 is two, and the number of the second lens 202 is three. However, it should be noted that the present disclosure is not limited by the numbers. For example, in some embodiments, the number of the first lens 102 may also be one, three, four, etc. The number of the second lens 202 may also be one, two, four, etc.

In some embodiments, the first lens subassembly 102 and the second lens subassembly 202 are fixed together, and a structural gap is formed between the first lens subassembly 102 and the second lens subassembly 202 and has a dimension value along the optical axis enabling the actually measured image plane of the optical system to match the target plane. Based on the actually measured field curvature and the target field curvature, it can be concluded whether the actually measured image plane matches the target plane. The actually measured field curvature can be obtained through actual measurement. The target field curvature is obtained based on the target plane corresponding to the lens assembly. In some embodiments, for any lens assembly, the structural gap between the first lens subassembly and the second lens subassembly is determined by characteristics of the first lens subassembly and the second lens subassembly themselves in the lens assembly. Especially, the dimension value of the structural gap along the optical axis is determined by optical characteristics of the first lens subassembly and the second lens subassembly themselves in the lens assembly. In other words, for different combinations of the first lens subassembly and the second lens subassembly, the dimension value of the structural gap along the optical axis may vary considerably.

Figure 4:
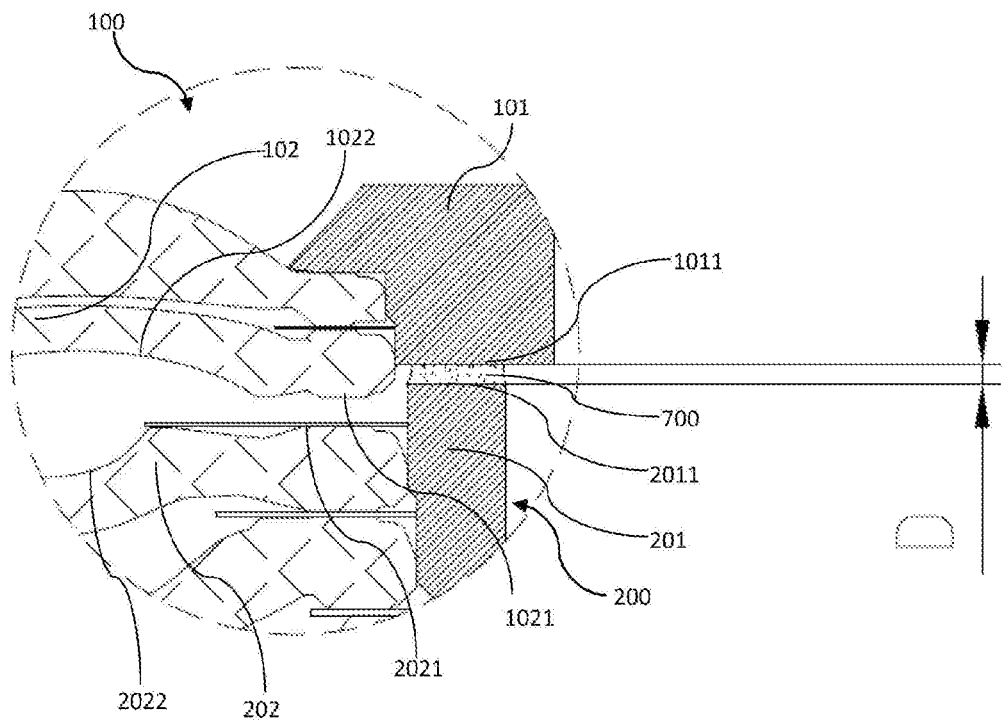
FIG. 4 shows an enlarged schematic diagram of a nearby area of the structural gap of the lens assembly in some embodiments of the present disclosure.

FIG. 4 shows an enlarged schematic diagram of a nearby area of the structural gap of the lens assembly in some embodiments of the present disclosure. In some embodiments, each of the first lens subassembly 100 and the second lens subassembly 200 has an optical surface and a structural surface. In the lens, the optical surface is a surface that allows effective light to pass through on the lens. The surface that does not belong to the optical surface on the lens is the structural surface. The surface on the lens cylinder belongs to structural surfaces.

Referring to FIG. 4, the first lens subassembly 100 includes a first lens cylinder 101 and a first lens 102. The first lens 102 is provided with a first lens optical surface 1022 and a first lens structural surface 1021, and the first lens cylinder 101 is provided with a first lens cylinder structural surface 1011. The second lens subassembly 200 includes a second lens cylinder 201 and a second lens 202. The second lens 202 is provided with a second lens optical surface 2022 and a second lens structural surface 2021. The second lens cylinder 201 is provided with a second lens cylinder structural surface 2011. The structural gap is a gap between the structural surface of the first lens subassembly and the structural surface of the second lens subassembly. A gap between optical surfaces or a gap between an optical surface and a structural surface does not belong to the structural gap. In the embodiment shown in FIG. 4, the structural gap is the gap between the first lens cylinder structural surface 1011 and the second lens cylinder structural surface 2011. When the first lens subassembly 100 and the second lens subassembly 200 are selected, the structural gap between them may determine the curvature of the image plane of the lens assembly. An adaptive dimension of the structural gap along the optical axis can enable the image plane of the lens assembly to match the target plane. In some embodiments, the first lens subassembly 100 and the second lens subassembly 200 are bonded together with a bonding material 700. The bonding material 700 belongs to neither the first lens subassembly 100 nor the second lens subassembly 200. In other words, a surface of the bonding material 700 is neither a structural surface of the first lens subassembly 100 nor a structural surface of the second lens subassembly 200. In some embodiments, the dimension value of the structural gap along the optical axis is less than 500 µm.

Figure 5:
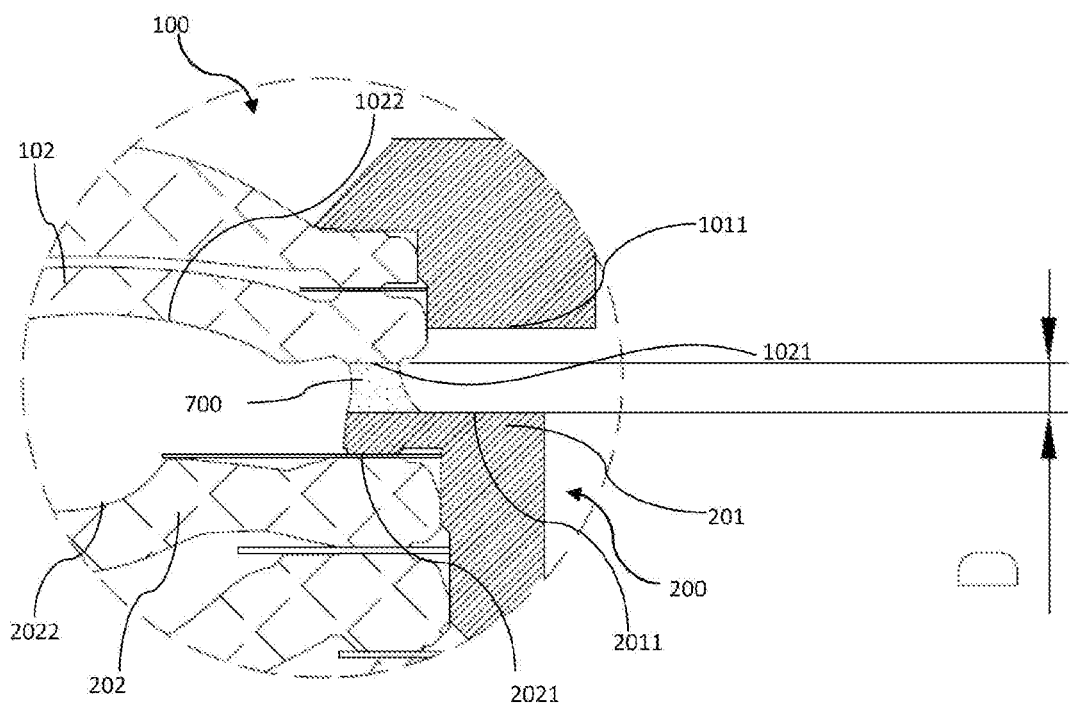
FIG. 5 shows an enlarged schematic diagram of the nearby area of the structural gap of the lens assembly in some embodiments of the present disclosure.

FIG. 5 shows an enlarged schematic diagram of the nearby area of the structural gap of the lens assembly in some embodiments of the present disclosure. Referring to FIG. 5, the first lens subassembly 100 includes a first lens cylinder 101 and a first lens 102. The first lens 102 is provided with a first lens optical surface 1022 and a first lens structural surface 1021, and the first lens cylinder 101 is provided with a first lens cylinder structural surface 1011. The second lens subassembly 200 includes a second lens cylinder 201 and a second lens 202. The second lens 202 is provided with a second lens optical surface 2022 and a second lens structural surface 2021. The second lens cylinder 201 is provided with a second lens cylinder structural surface 2011. In some embodiments, a first structural surface is a structural surface closest to the second lens subassembly on the first lens subassembly, and a second structural surface is a structural surface closest to the first lens subassembly on the second lens subassembly. Because the first lens structural surface 1021 is closer to the second lens subassembly 200 than the first lens cylinder structural surface 1011, the first lens structural surface 1021 is the first structural surface. The second lens cylinder structural surface 2011 is the second structural surface. Therefore, a structural gap is the gap between the first lens structural surface 1021 and the second lens cylinder structural surface 2011. In some embodiments, the bonding material 700 belongs to neither the first lens subassembly 100 nor the second lens subassembly 200. In other words, the surface of the bonding material 700 is neither a structural surface of the first lens subassembly 100 nor a structural surface of the second lens subassembly 200.

Figure 6:
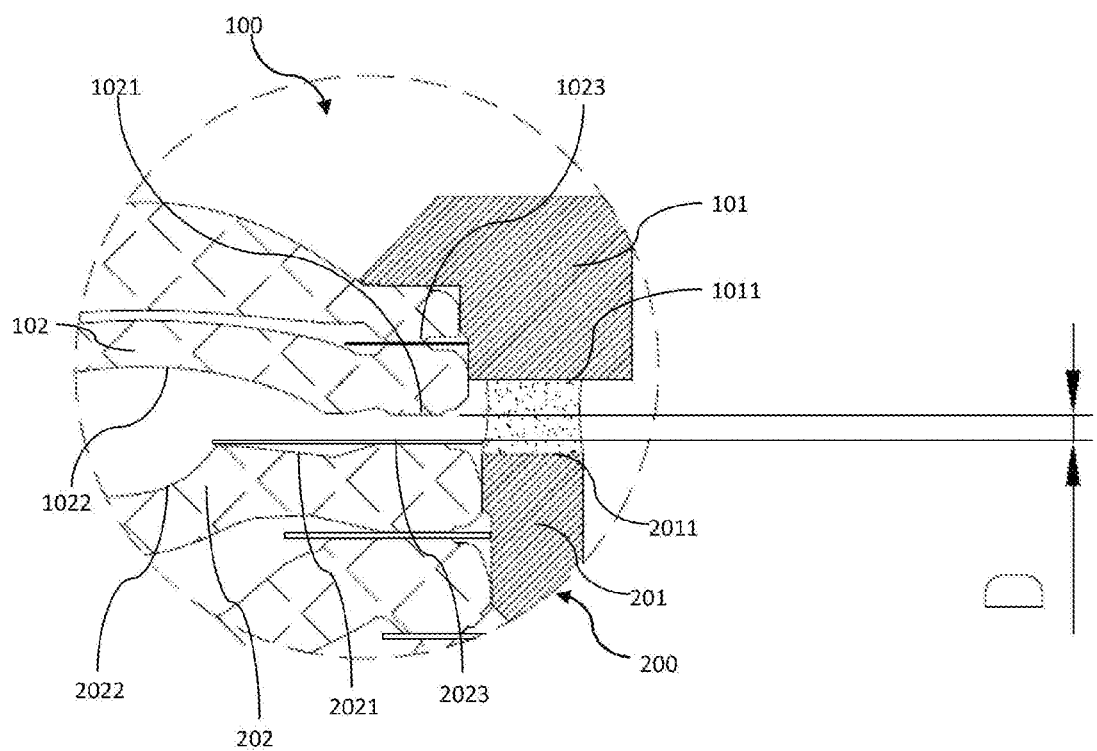
FIG. 6 shows an enlarged schematic diagram of the nearby area of the structural gap of the lens assembly in some embodiments of the present disclosure.

Referring to FIG. 6, it shows an enlarged schematic diagram of the nearby area of the structural gap of the lens assembly in some embodiments of the present disclosure. Referring to FIG. 6, the first lens subassembly 100 includes a first lens cylinder 101 and a first lens 102. The first lens 102 is provided with a first lens optical surface 1022 and a first lens structural surface 1021, and the first lens cylinder 101 is provided with a first lens cylinder structural surface 1011. The second lens subassembly 200 includes a second lens cylinder 201 and a second lens 202. The second lens 202 is provided with a second lens optical surface 2022 and a second lens structural surface 2021. The second lens cylinder 201 is provided with a second lens cylinder structural surface 2011. In some embodiments, a first structural surface is a structural surface closest to the second lens subassembly on the first lens subassembly, and a second structural surface is a structural surface closest to the first lens subassembly on the second lens subassembly. Because the first lens structural surface 1021 is closer to the second lens subassembly 200 than the first lens cylinder structural surface 1011, the first lens structural surface 1021 is the first structural surface. Especially, in some embodiments, the first lens subassembly 100 is further provided with a first lens structural accessory 1023, and the second lens subassembly 202 is further provided with a second lens structural accessory 2023. The second structural surface is positioned on the second lens structural accessory 2023. A structural gap D is a gap between the first lens structural surface 1021 and a structural surface of the second lens structural accessory 2023. In some embodiments, each of the second lens structural accessory 2023 and the first lens structural accessory 1023 is a spacer ring mounted on the lens cylinder. However, it should be noted that the lens structural accessory in some embodiments is not limited to this, for example, the first lens structural accessory may include a first spacer ring mounted on the first lens cylinder, or a bonding material for bonding the first spacer ring to the first lens cylinder or the first lens, or a bonding material for bonding the first lens to the first lens cylinder. The second lens structural accessory may further include a second spacer ring mounted on the second lens cylinder, or a bonding material for bonding the second spacer ring to the second lens cylinder or the second lens, or a bonding material for bonding the second lens to the second lens cylinder.

Figure 7:
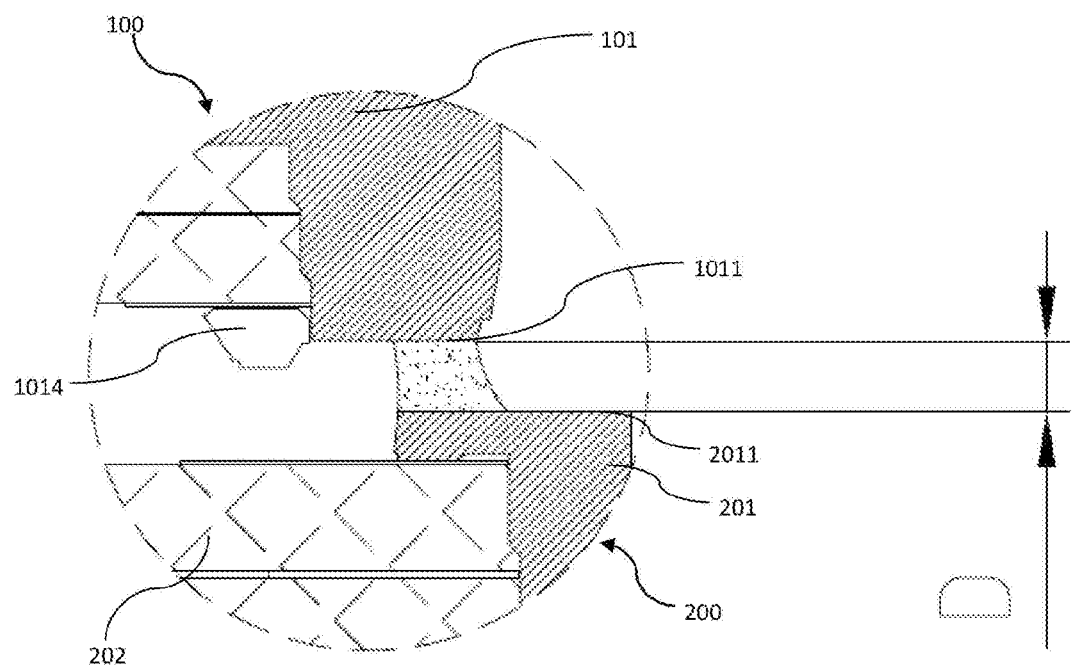
FIG. 7 shows an enlarged schematic diagram of the nearby area of the structural gap of the lens assembly in some embodiments of the present disclosure.

FIG. 7 shows an enlarged schematic diagram of the nearby area of the structural gap of the lens assembly in some embodiments of the present disclosure. As shown in FIG. 7, in some embodiments, the first lens subassembly 100 includes a first spacer ring 1014. It can be easily seen that a distance between the first spacer ring 1014 and the second lens subassembly 200 is greater than a distance between the first lens cylinder structural surface 1011 and the second lens cylinder structural surface 2011, so that the first spacer ring 1014 does not influence the dimension of the structural gap. In some embodiments, the structural gap D is a gap between the first lens cylinder structural surface 1011 and the second lens cylinder structural surface 2011.

Figure 8:
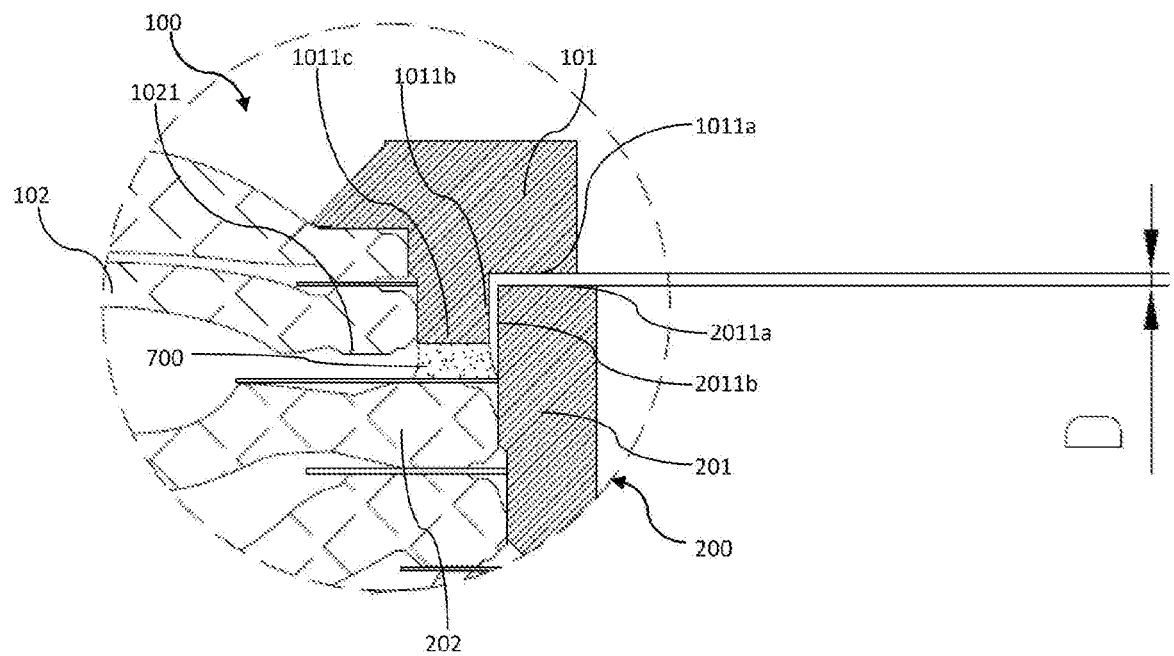
FIG. 8 shows an enlarged schematic diagram of the nearby area of the structural gap of the lens assembly in some embodiments of the present disclosure.

FIG. 8 shows an enlarged schematic diagram of the nearby area of the structural gap of the lens assembly in some embodiments of the present disclosure. Referring to FIG. 8, in some embodiments, the first lens cylinder 101 is provided with three first lens cylinder structural surfaces 1011a, 1011b and 1011c, and the second lens cylinder 201 is provided with two second lens cylinder structural surfaces 2011a and 2011b. The structural gap D is a gap between the first lens cylinder structural surface 1011a and the second lens cylinder structural surface 2011a. In some embodiments, although a gap between the first lens cylinder structural surface 1011b and the second lens cylinder structural surface 2011b is the smallest, the gap between them is radial (i.e., perpendicular to the optical axis direction). In some embodiments, an effect of matching the image plane to the target plane is obtained by limiting an axial (i.e., along the optical axis) dimension value of the structural gap. Therefore, the gap between the first lens cylinder structural surface 1011a and the second lens cylinder structural surface 2011a, which has the shortest axial distance, is used as the structural gap D.

Figure 9:
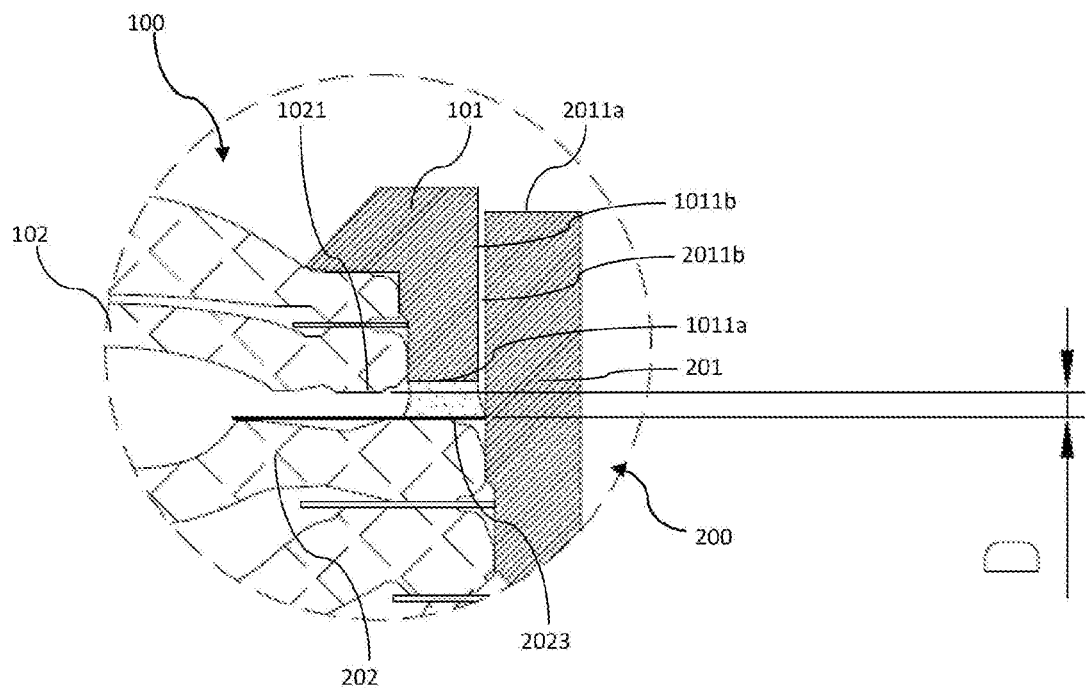
FIG. 9 shows an enlarged schematic diagram of the nearby area of the structural gap of the lens assembly in some embodiments of the present disclosure.

FIG. 9 shows an enlarged schematic diagram of the nearby area of the structural gap of the lens assembly in some embodiments of the present disclosure. Referring to FIG. 9, in some embodiments, the first lens cylinder 101 is provided with two first lens cylinder structural surfaces 1011a and 1011b, and the second lens cylinder 201 is provided with two second lens cylinder structural surfaces 2011a and 2011b. The first lens 102 is provided with a first lens structural surface 1021, and the second lens 202 is provided with a second lens structural accessory 2023. In some embodiments, the first lens cylinder structural surface 1011b is closest to the second lens subassembly cylinder structural surface 2011b, but the gap between them is a radial gap rather than an axial gap. As described in the previous embodiment, the effect of matching the image plane to the target plane is achieved by limiting an axial dimension value of the structural gap. Therefore, the gap between the first lens cylinder structural surface 1011b and the second lens cylinder structural surface 2011b is not the structural gap. Considering the whole first lens subassembly 100 and the whole second lens subassembly 200, the closest structural surfaces in an axial direction between the two lens subassemblies are the first lens structural surface 1021 and a structural surface positioned on the second lens structural accessory 2023. Therefore, the structural gap D in some embodiments is a gap between the first lens structural surface 1021 and the structural surface positioned on the second lens structural accessory 2023. Especially, in some embodiments, the second lens cylinder structural surface 2011a of the second lens cylinder 201 is positioned outside the first lens cylinder 101, which results in that the first lens cylinder 101 does not have a corresponding structure surface in the axial direction. Therefore, the second lens cylinder structural surface 2011a is not the structure surface for determining the structural gap D. In other words, in some embodiments, the first structural surface should be positioned within a projected area of the second lens subassembly along the optical axis, and the second structural surface should be within a projected area of the first lens subassembly along the optical axis.

Figure 10:
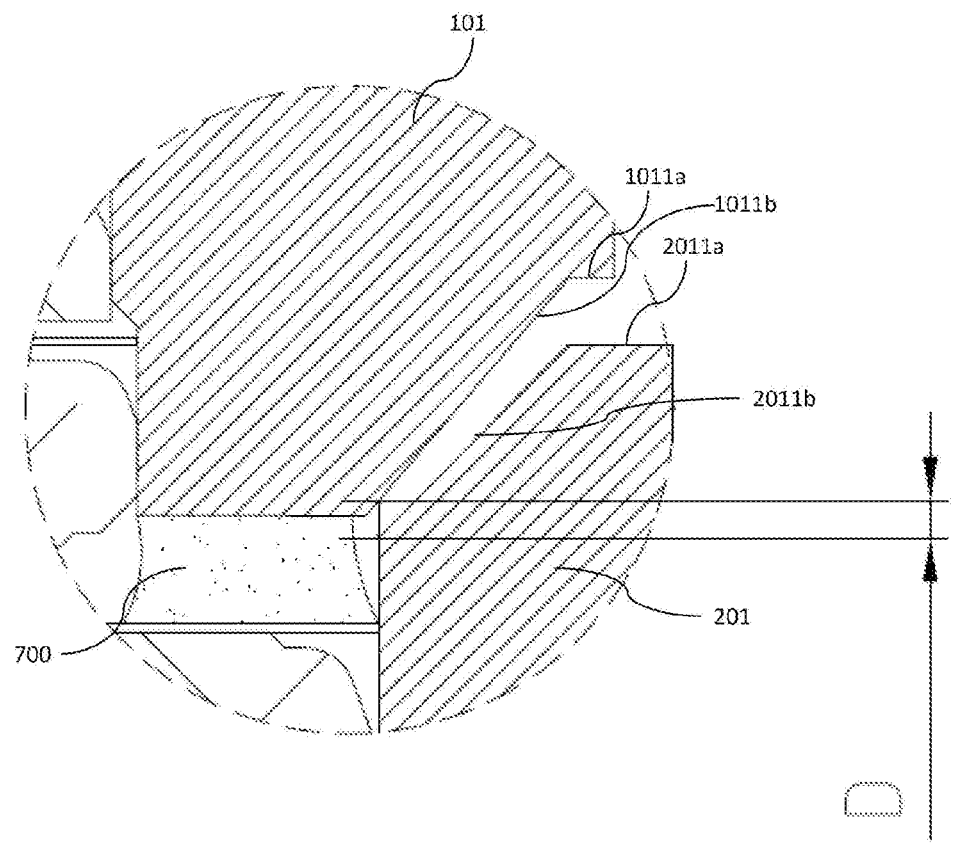
FIG. 10 shows an enlarged schematic diagram of the nearby area of the structural gap of the lens assembly in some embodiments of the present disclosure.

FIG. 10 shows an enlarged schematic diagram of the nearby area of the structural gap of the lens assembly in some embodiments of the present disclosure. Referring to FIG. 10, the first lens cylinder 101 is provided with two first lens cylinder structural surfaces 1011a and 1011b, and the second lens cylinder 201 is provided with two second lens cylinder structural surfaces 2011a and 2011b. Both the first lens cylinder structural surface 1011b and the second lens cylinder structural surface 2011b are inclined planes. It can be seen that the axial distance between the two inclined planes is smaller than that between the first lens cylinder structural surface 1011a and the second lens cylinder structural surface 2011a. Therefore, the structural gap D is a gap between the first lens cylinder structural surface 1011b and the second lens cylinder structural surface 2011b. In some embodiments, the first lens cylinder structural surface 1011b and the second lens cylinder structural surface 2011b are not parallel, and the smallest axial distance between the first lens cylinder structural surface 1011b and the second lens cylinder structural surface 2011b is taken as the dimension value of the structural gap in the axial direction. It should be noted that this method of determining value is not unique. For example, in some embodiments, when the first structural surface is not parallel to the second structural surface, the dimension value of the structural gap in the axial direction may also be an average value of the axial distance between the first structural surface and the second structural surface.

Figure 11:
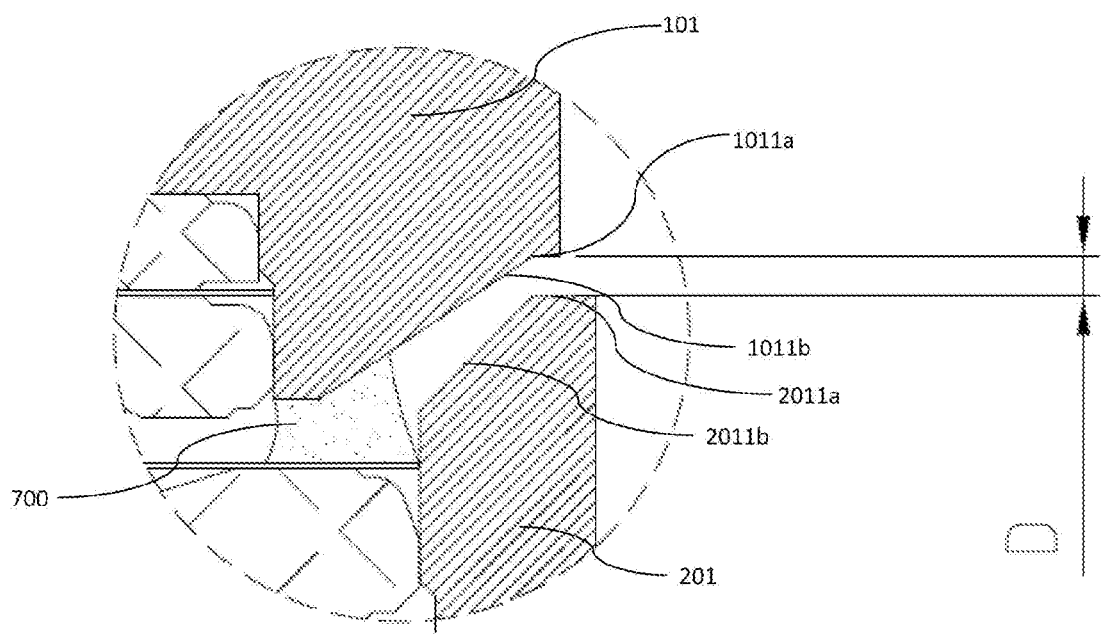
FIG. 11 shows an enlarged schematic diagram of the nearby area of the structural gap of the lens assembly in some embodiments of the present disclosure.

FIG. 11 shows an enlarged schematic diagram of the nearby area of the structural gap of the lens assembly in some embodiments of the present disclosure. Referring to FIG. 11, the first lens cylinder 101 is provided with two first lens cylinder structural surfaces 1011a and 1011b, and the second lens cylinder 201 is provided with two second lens cylinder structural surfaces 2011a and 2011b. Both the first lens cylinder structural surface 1011b and the second lens cylinder structural surface 2011b are inclined planes. It can be seen that the axial distance between the two inclined planes is not smaller than that between the first lens cylinder structural surface 1011a and the second lens cylinder structural surface 2011a. Therefore, the structural gap D is the gap between the first lens cylinder structural surface 1011a and the second lens cylinder structural surface 2011a.

Figure 12:
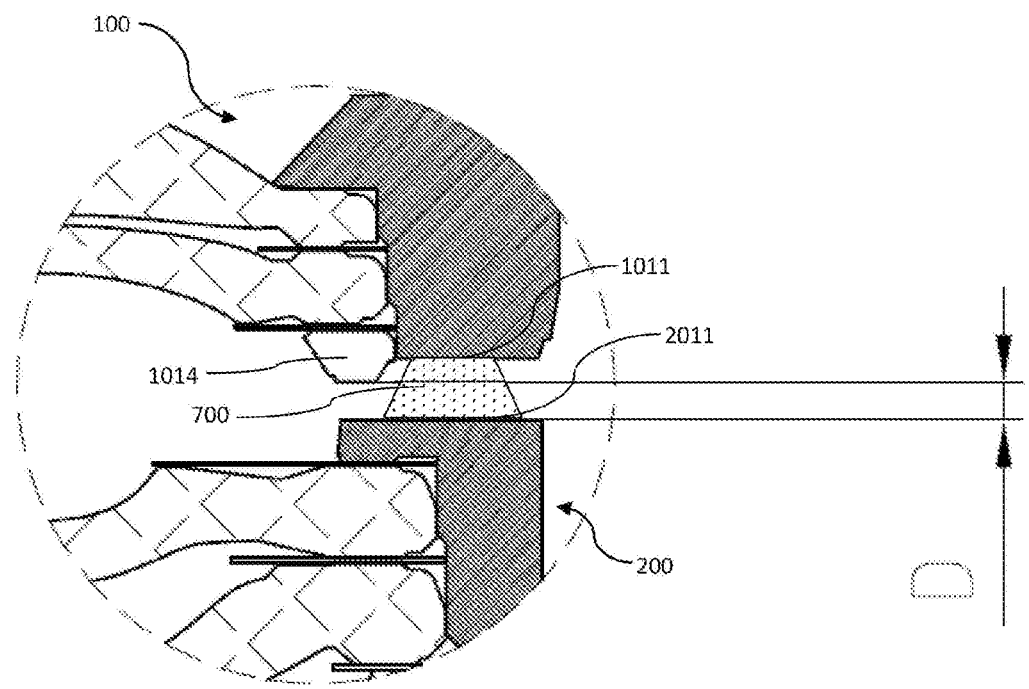
FIG. 12 shows an enlarged schematic diagram of the nearby area of the structural gap of the lens assembly in some embodiments of the present disclosure.

FIG. 12 shows an enlarged schematic diagram of the nearby area of the structural gap of the lens assembly in some embodiments of the present disclosure. Referring to FIG. 12, in some embodiments, the first lens subassembly 100 includes a first spacer ring 1014. Unlike the embodiments shown in FIG. 7, the distance between the first spacer ring 1014 and the second lens cylinder structural surface 2011 is smaller than the distance between the first lens cylinder structural surface 1011 and the second lens cylinder structural surface 2011. Therefore, in some embodiments, the structural gap D is the gap between the first spacer ring 1014 and the second lens cylinder structural surface 2011. In other words, in some cases, the structural surface of a lens structural accessory can affect the value of the structural gap D.

Figure 13:
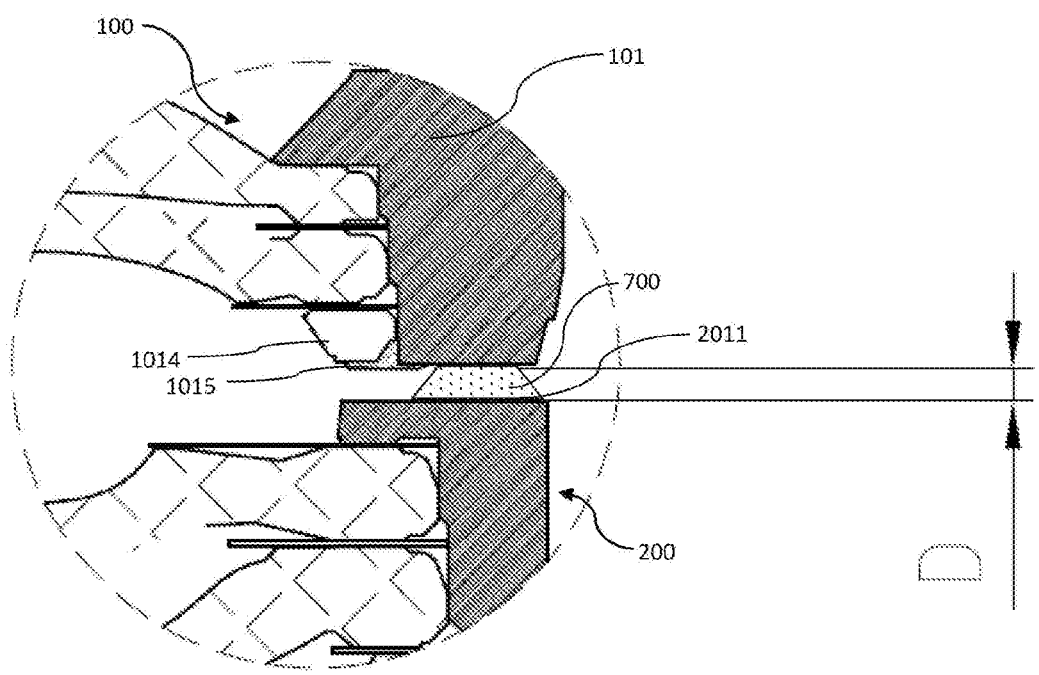
FIG. 13 shows an enlarged schematic diagram of the nearby area of the structural gap of the lens assembly in some embodiments of the present disclosure.

FIG. 13 shows an enlarged schematic diagram of the nearby area of the structural gap of the lens assembly in some embodiments of the present disclosure. Referring to FIG. 13, in some embodiments, the first lens subassembly 100 includes a first spacer ring 1014 and a first bonding material 1015. The first bonding material 1015 bonds the first spacer ring 1014 to the first lens cylinder 101. In some embodiments, the first bonding material 1015 should be regarded as a part of the first lens subassembly 100, so that the structural surface of the first bonding material 1015 also belongs to a part of the first lens subassembly 100. Because the structural surface of the first bonding material 1015 is the structural surface closest to the second lens subassembly 200 in the axial direction, the structural surface of the first bonding material 1015 is used as the first structural surface in some embodiments, and the second lens cylinder structural surface 2011 corresponding to the first structural surface is used as the second structural surface. Therefore, the structural gap D is a gap between the structural surface of the first bonding material 1015 and the second lens cylinder structural surface 2011. When the structural surface of the first bonding material 1015 is not parallel to the second lens cylinder structural surface 2011, the average distance between the structural surface of the first bonding material 1015 and the second lens cylinder structural surface 2011 in the axial direction may be used as a dimension value of the structural gap in the axial direction. It is particularly important to note that the bonding material 700 for bonding the first lens subassembly 100 and the second lens subassembly 200 belongs to neither the first lens subassembly 100 nor the second lens subassembly 200. In other words, a surface of the bonding material 700 is neither a structural surface of the first lens subassembly 100 nor a structural surface of the second lens subassembly 200.

The above embodiments introduce a plurality of implementations of the nearby area of the structural gap of the lens assembly provided by the present disclosure. The above embodiments are only illustrative and other situations may also be used in the present disclosure. For example, in some embodiments, the structural gap can be defined as follows.

For the first lens subassembly, a structural surface of the first lens subassembly that is closest to the second lens subassembly along the optical axis and is positioned within a projected area of the second lens subassembly along the optical axis, is used as the first structural surface; and for the second lens subassembly, a structural surface of the second lens subassembly that is closest to the first lens subassembly along the optical axis and is positioned within a projected area of the first lens subassembly along the optical axis, is used as the second structural surface. An average structural gap between the first structural surface and the second structural surface is used as the structural gap. The average structural gap is an average gap along the optical axis between the first structural surface and the second structural surface.

In some embodiments, the first structural surface may be positioned on the first lens structural accessory which includes a first spacer ring mounted on the first lens cylinder, or a bonding material for bonding the first spacer ring to the first lens cylinder or the first lens, or a bonding material for bonding the first lens to the first lens cylinder.

In some embodiments, the second structural surface may be positioned on the second lens structural accessory which includes a second spacer ring mounted on the second lens cylinder, or a bonding material for bonding the second spacer ring to the second lens cylinder or the second lens, or a bonding material for bonding the second lens to the second lens cylinder.

It should be noted that the bonding material 700 for bonding the first lens subassembly to the second lens subassembly belongs to neither the first lens subassembly 100 nor the second lens subassembly 200. In other words, the bonding material 700 for bonding the first lens subassembly to the second lens subassembly cannot be confused with the bonding material used as a part of the first or second lens structural accessory. In the present disclosure, a surface of the bonding material 700 is neither a structural surface of the first lens subassembly 100 nor a structural surface of the second lens subassembly 200.

Further, in some embodiments, the first lens subassembly and the second lens subassembly can be fixed together by welding. The bonding material 700 is not needed in some situations. The welding may be laser welding or ultrasonic welding.

Further, according to some embodiments of the present disclosure, a lens assembly assembled based on the method for assembling the lens assembly in some embodiments is further provided. As described above, a structural gap is formed between the first lens subassembly and the second lens subassembly of the lens assembly produced by such an assembly method.

In general, in a traditional assembly scheme, dimension parameters of a plurality of products with an identical design are highly consistent. However, in the assembly method of the some embodiments, since the first lens subassembly and the second lens subassembly are moved relatively along the optical axis to match the actually measured field curvature and the target field curvature in the step 3, the products with the identical design may have different structural gaps.

For the lens subassemblies, due to limitations of the control ability of mold precision and forming precision, the thickness of the optical surface, the sagittal height of the optical surface, the radius of curvature of the surface pattern of the optical surface, etc. of each lens may have tolerances; due to limitations of machining precision of an element, the thicknesses of spacing elements between the lenses may have a tolerance; due to limitations of a dimensional tolerance of the assembled elements and assembly precision of the lens, the assembly matching of lenses may have a tolerance; and due to limitations of stability of a material and consistence of batches, the refractive index of a lens material may change. The above factors lead to that any lens subassembly is unique, so for each combination of a first lens subassembly and a second lens subassembly, the relative distance between the first lens subassembly and the second lens subassembly along the optical axis that enables the actually measured field curvature to match the target field curvature is also unique. Therefore, the dimension values, along the optical axis, of the structural gaps of the lens assemblies produced in batches by using the assembly method of the present embodiment have differences. The differences are 2-60 μm. For example, for a plurality of lens assemblies with an identical design, they are provided with structural gaps D1, D2 . . . Dn. The difference between at least two of D1, D2 . . . Dn is within range of 2-60 μm. In other words, based on some embodiments, the plurality of lens assemblies with the identical design at least include a first lens assembly and a second lens assembly, and the dimension value of the structural gap of the first lens assembly along the optical axis and the dimension value of the structural gap of the second lens assembly along the optical axis have a difference of 2-60 μm. In some embodiments, the identical design refers to an identical set of optical design and an identical set of structural design. It cannot be regarded as different designs with only different labels, marks and other additives.

In some embodiments, the first lens subassembly is provided with a first structural surface, which is closest to the second lens subassembly along the optical axis and is positioned within a projected area of the second lens subassembly along the optical axis; the second lens subassembly is provided with a second structural surface, which is closest to the first lens subassembly along the optical axis and is positioned within a projected area of the first lens subassembly along the optical axis; and the structural gap is an average structural gap, which is an average gap between the first structural surface and the second structural surface at a section plane of the optical surface.

Figure 14:
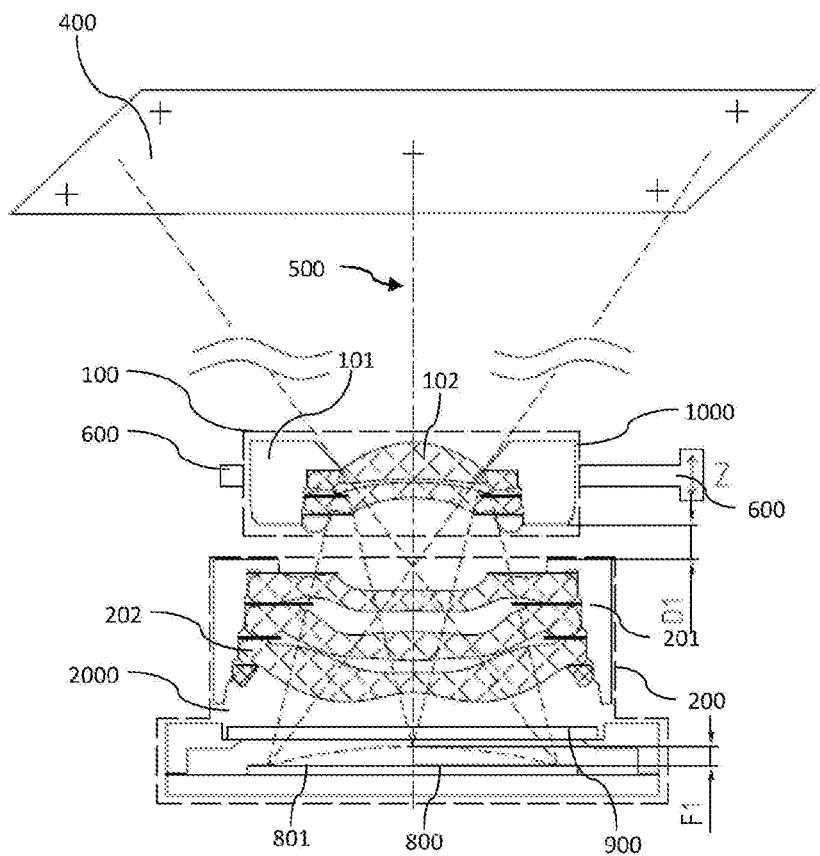
FIG. 14 shows a method for assembling a camera module provided by some embodiments according to the present disclosure.

Further, FIG. 14 shows a method for assembling a camera module provided by some embodiments according to the present disclosure. The method for assembling the camera module includes steps 10-40.

Step 10: preparing a first subcomponent 1000 and a second subcomponent 2000. The first subcomponent 1000 includes a first lens subassembly 100. The second subcomponent includes a second lens subassembly 200 and a photosensitive element 800. A color filter element 900 is mounted between the second lens subassembly 200 and the photosensitive element 800. The first lens subassembly 100 includes a first lens cylinder 101 and a first lens 102 mounted in the first lens cylinder 101. The number of the first lens 102 in some embodiments is two, but it should be noted that the present disclosure is not limited by this number. For example, in some embodiments, the number of the first lens 102 may also be one, three, four, etc. The second lens subassembly 200 includes a second lens cylinder 201 and a second lens 202 mounted in the second lens cylinder 201. The number of the second lens 202 in some embodiments is three, but it should be noted that the present disclosure is not limited by this number. For example, in some embodiments, the number of the second lens 202 may also be one, two, four, etc.

Step 20: arranging the first lens subassembly 100 on an optical axis 500 of the second lens subassembly 200 to form an imaging optical system including the first lens 102 and the second lens 202. In some embodiments, the optical system includes an object side target 400, two first lenses 102, three second lenses 202 and a photosensitive element 800. In some embodiments, the photosensitive element 800 is provided with a photosensitive surface 801. By utilizing the photosensitive surface 801, an image plane of the optical system can be detected. In some embodiments, the photosensitive element 800 is a photosensitive element mounted in the assembled camera module.

Step 30: moving the first lens subassembly 100 and the second lens subassembly 200 relatively along the optical axis 500 to match an image plane of the imaging of the optical system and a target plane.

An expected imaging plane will be provided for an assembled camera module, and is known as a target plane in this disclosure. In some cases, the target plane is a flat plane. For example, if the photosensitive surface of the photosensitive element of the camera module is a flat plane, the expected imaging plane of the lens assembly is also a flat plane, in order to achieve optimal imaging quality. In other words, the target plane is a flat plane in some situations. In some cases, the target plane may also be a convex plane, a concave plane, or a wavy plane. For example, if the photosensitive surface of the photosensitive element of the camera module is a convex plane or a concave plane, the target plane should also be a convex plane or a concave plane, in order to achieve optimal imaging quality. If the photosensitive surface of the photosensitive element of the camera module is a wavy plane, the target plane should also be a wavy plane.

In some embodiments, in step 30, whether the actually measured image plane of the imaging of the optical system matches the target plane is identified on the basis of an image outputted by the photosensitive element 800. Because the shape of the photosensitive surface 801 of the photosensitive element is the shape of the expected imaging plane, i.e., the photosensitive surface 801 is the target plane, an image received by the photosensitive surface 801 has connoted bending information of the target plane. Therefore, in order to improve the imaging quality, the field curvature obtained according to the image outputted by the photosensitive element 800 should be as small as possible. In order to facilitate description, the field curvature obtained according to the image outputted by the photosensitive element 800 is called an actually measured field curvature of the module. When the actually measured field curvature of the module approaches zero, the shape of the image plane formed by the imaging of the optical system matches the target plane. In this state, better imaging quality can be obtained.

Further, in some embodiments, at least one field of view is selected as a test field of view. The actually measured field curvature corresponding to the test field of view is an axial deviation of an actually measured image plane at the test field of view relative to an actually measured image plane at the reference field of view. Here, the actually measured image plane is an image plane actually received by using the image side target 300. The test field of view preferably is a field of view in range between a 40% field of view and an 85% field of view. The reference field of view may be a zero field of view (or known as a central field of view). However, it should be noted that the reference field of view of the present disclosure is not limited to the zero field of view. Further, in some embodiments, the matching between the actually measured image plane and the target plane includes that the actually measured field curvature of the module is within range of +/−5 μm. In other words, when the actually measured field curvature of the module is within range of +/−5 μm, it is deemed that the actually measured image plane matches the target plane. In some embodiments, there is only one selected test field of view.

Further, in some embodiments, the number of the selected test field of view may be more than one, for example, two to ten. For each test field of view, if the actually measured field curvature of the module is within range of +/−5 μm, it is deemed that the actually measured image plane matches the target plane.

Further, in some embodiments, if the convergence of the actually measured field curvature of the module in at least one of a sagittal direction or a tangential direction is controlled to be within range of +/−5 μm, it is deemed that the actually measured image plane matches the target plane.

Further, the step 30 includes sub-steps as follows.

Step 310: moving the object side target or the image side target along the optical axis to make the optical system image clearly, namely, complete the focusing of the optical system. The central field of view is selected for focusing in some embodiments.

Step 320: moving the first lens subassembly 100 and the second lens subassembly 200 relatively along the optical axis 500, and stopping at an actually measured position. In a specific implementation, the second lens subassembly 200 may be stationary and the first lens subassembly 100 is moved along the optical axis 500; or, the first lens subassembly 100 may be stationary and the second lens subassembly 200 is moved along the optical axis 500; or, both the first lens subassembly 100 and the second lens subassembly are moved along the optical axis 500.

Referring to FIG. 14, in some embodiments, the second lens subassembly 200 is stationary, and a clamping assembly 600 is utilized to clamp the first lens subassembly 100 and is moved along a z axis (i.e., moved along the optical axis 500), thereby moving the first lens subassembly 100 and the second lens subassembly 200 relatively along the optical axis 500. In some embodiments, the clamping assembly 600 may be replaced by a sucking assembly.

Step 330: obtaining the actually measured field curvature of the module of the imaging of the optical system at a current actually measured position. At the current actually measured position, the first lens subassembly 100 and the second lens subassembly 200 stop moving relatively. In some situations, the actually measured field curvature of the module of the optical system is measured through the photosensitive element 800. A corresponding resolving power defocus curve for the test field of view, which is called a test field of view defocus curve for short, can be obtained through the photosensitive element 800. A corresponding resolving power defocus curve for the reference field of view, which is called a reference field of view defocus curve for short, can also be obtained through the photosensitive element 800. During actual measurement, a plurality of measuring points will be taken for each test field of view. Each measuring point corresponds to one defocus curve, and the axial deviation, which is a vector, between an average value of vertex positions of defocus curves of measuring points and a vertex position of the reference field of view defocus curve (when the reference field of view is a zero field of view) is the actually measured field curvature corresponding to the test field of view. The axial deviation is the deviation along the optical axis 500. The deviation can be regarded as a deviation value of the actually measured image plane at the test field of view relative to the actually measured image plane at the reference field of view. When the reference field of view is not a zero field of view, the vertex position of the reference field of view defocus curve refers to the average value of the vertex positions of plurality of defocus curves of plurality of reference points on the reference field of view.

Figure 15:
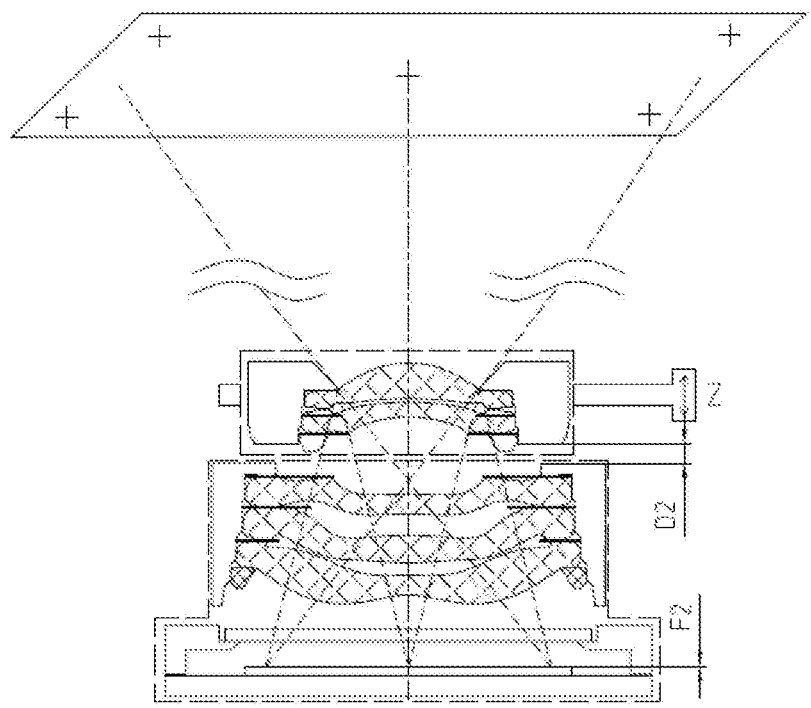
FIG. 15 shows a schematic diagram of complete coincidence between the actually measured image plane of the camera module and the target plane.

Step 340: judging whether the actually measured field curvature of the module at the current actually measured position is in a target range, carrying out the step 40 if the actually measured field curvature at the current actually measured position is in the target range, or continuing to carry out the sub-step 320 and the sub-step 330 if the actually measured field curvature at the current actually measured position is not in a target range until the actually measured field curvature of the module at the current actually measured position is in the target range. In some embodiments, the target range is a range of +/−5 μm. When the actually measured field curvature of the module is zero, the actually measured image plane completely coincides with the target plane. FIG. 15 shows a schematic diagram of complete coincidence between an actually measured image plane of the camera module and the target plane.

In some embodiments, after the end of step 30, other adjustment steps may be optionally carried out, and then step 40 is carried out after the other adjustment steps are completed.

Step 40: connecting the first lens subassembly 100 with the second lens subassembly 200 to fix the relative distance between the first lens subassembly 100 and the second lens subassembly 200 along the optical axis 500. After the connection is completed, the first lens subassembly 100 and the second lens subassembly 200 are fixed together to form a complete lens assembly.

In some embodiments, a complete lens assembly is formed by two lens subassemblies. In some embodiments, a complete lens assembly may be formed by a greater number of lens subassemblies.

In some embodiments, the axial distance between two lens subassemblies is adjusted in an assembly process, so that the field curvature of the assembled camera module is effectively reduced. Moreover, the assembly method provided by the above embodiments can enable the field curvature distribution of the camera module produced in enormous quantities to be converged, and the process capability index (CPK) to be improved. According to some embodiments, the field curvature of the camera module can be adjusted in real time in an assembly process, so that the field curvature fluctuation is reduced, the rejection rate caused by the field curvature is reduced, the production cost is reduced, and the imaging quality is improved. According to some embodiments, the requirements on the precision of elements and the assembly precision of the camera module can be loosened, thereby reducing the overall cost of the camera module.

In the present disclosure, in the step 40, a process for connecting the first lens subassembly and the second lens subassembly may be selected according to circumstances. For example, in some embodiments, the first lens subassembly and the second lens subassembly are connected through a bonding process. In some embodiments, the first lens subassembly and the second lens subassembly are connected through a laser welding process. In some embodiments, the first lens subassembly and the second lens subassembly are connected through an ultrasonic welding process. In addition to the above processes, other welding processes are also available. The first lens subassembly and the second lens subassembly can be connected directly or connected through an intermediate, such as a rigid intermediate. For example, the first lens subassembly can be connected with the second lens subassembly through a third lens subassembly (or a third subcomponent). In this situation, the third lens subassembly (or the third subcomponent) may be regarded as the intermediate.

According to some embodiments of the present disclosure, a camera module is further provided. The camera module includes a first subcomponent and a second subcomponent. The first subcomponent includes a first lens subassembly including a first lens cylinder and a first lens. The second subcomponent includes a second lens subassembly and a photosensitive element, and the second lens subassembly includes a second lens cylinder and a second lens. The first lens subassembly is mounted on the optical axis of the second lens subassembly to form an imaging optical system including the first lens and the second lens; and the first lens subassembly and the second lens subassembly are fixed together, and a structural gap is formed between the first lens subassembly and the second lens subassembly and has a dimension value along the optical axis that enables the actually measured image plane of the optical system to match the target plane. The second subcomponent may further include a color filter element between the photosensitive element and the second lens.

In some embodiments, for the dimension value of the structural gap along the optical axis, the enabling the actually measured image plane of the optical system to match the target plane includes: acquiring an actually measured field curvature of the module of the imaging of the optical system at one or more actually measured position according to an image outputted by the photosensitive element, wherein the actually measured field curvature of the module is within range of +/−5 μm.

In some embodiments, each of the first lens subassembly and the second lens subassembly is provided with an optical surface belonging to the optical system and a structural surface beyond the optical surface; and the structural gap is a gap between the structural surface of the first lens subassembly and the structural surface of the second lens subassembly.

Further, in some embodiments, the first lens subassembly is provided with a first structural surface, which is closest to the second lens subassembly along the optical axis and is positioned within a projected area of the second lens subassembly along the optical axis; the second lens subassembly is provided with a second structural surface, which is closest to the first lens subassembly along the optical axis and is positioned within a projected area of the first lens subassembly along the optical axis; and the structural gap is an average structural gap, which is an average gap between the first structural surface and the second structural surface at a section plane of the optical surface.

In a series of embodiments, the structural gap of the camera module may be the structural gaps shown in FIG. 4 to FIG. 13. These structural gaps have been described in detail hereinabove, and will not be repeated here.

In some embodiments, the dimension value of the structural gap along the optical axis is less than 500 μm.

Further, according to some embodiments of the present disclosure, a camera module assembled by using the aforementioned method for assembling the camera module is further provided. A structural gap is formed between the first subcomponent and the second subcomponent of the camera module. In a plurality of optical components with an identical design, there are at least a first optical component and a second optical component that the dimension value of the structural gap of the first optical component along the optical axis and the dimension value of the structural gap of the second optical component along the optical axis have a difference of 2-60 μm. In general, in a traditional assembly scheme, dimension parameters of a plurality of products with an identical design are highly consistent. However, in the assembly method of the present embodiment, since the first lens subassembly and the second lens subassembly are moved relatively along the optical axis to match the actually measured image plane and the target plane in the step 30, the products with an identical design may have different structural gaps. In some embodiments, the identical design refers to an identical set of optical design and an identical set of structural design. It cannot be regarded as different designs with only different labels, marks and other additives.

In some embodiments, each of the first lens subassembly and the second lens subassembly is provided with an optical surface belonging to the optical system and a structural surface beyond the optical surface; and the structural gap is a gap between the structural surface of the first lens subassembly and the structural surface of the second lens subassembly.

In some embodiments, the first lens subassembly is provided with a first structural surface, which is closest to the second lens subassembly along the optical axis and is positioned within a projected area of the second lens subassembly along the optical axis; the second lens subassembly is provided with a second structural surface, which is closest to the first lens subassembly along the optical axis and is positioned within a projected area of the first lens subassembly along the optical axis; and the structural gap is an average structural gap along the optical axis between the first structural surface and the second structural surface.

The above descriptions only provide an explanation of some embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for assembling a lens assembly, comprising:
preparing a first lens subassembly and a second lens subassembly, the first lens subassembly comprising a first lens cylinder and a first lens, and the second lens subassembly comprising a second lens cylinder and a second lens;
arranging the first lens subassembly on an optical axis of the second lens subassembly to form an imaging optical system comprising the first lens and the second lens;
moving the first lens subassembly and the second lens subassembly relatively along the optical axis, acquiring an actually measured field curvature of the optical system at an actually measured position, and matching the actually measured field curvature and a target field curvature so as to match an actually measured image plane of the optical system and a target plane; and
connecting the first lens subassembly and the second lens subassembly to fix a relative distance between the first lens subassembly and the second lens subassembly along the optical axis, wherein the actually measured field curvature is an axial deviation of the actually measured image plane at a test field of view relative to the actually measured image plane at a reference field of view.

2. The method for assembling a lens assembly according to claim 1, wherein the target field curvature is an axial deviation of the target plane at the test field of view relative to the target plane at the reference field of view.

3. The method for assembling a lens assembly according to claim 2, wherein the matching the actually measured image plane and the target plane comprises:
making a difference between the actually measured field curvature and the target field curvature be in range of +/−5 μm.

4. The method for assembling a lens assembly according to claim 1, wherein the target plane is a flat plane, a convex plane, a concave plane, or a wavy plane.

5. The method for assembling a lens assembly according to claim 1, further comprising:
selecting at least one field of view as the test field of view.

6. The method for assembling a lens assembly according to claim 1, wherein the test field of view is in range of a 40% field of view to an 85% field of view.

7. The method for assembling a lens assembly according to claim 6, wherein the matching the actually measured image plane and the target plane comprises:
selecting 2-10 fields of view as the test field of view, and making a difference between the actually measured field curvature and the target field curvature at each of the selected fields of view be in range of +/−5 μm.

8. The method for assembling a lens assembly according to claim 1, wherein the matching the actually measured image plane and the target plane comprises:
controlling convergence of the actually measured field curvature in at least one of a sagittal direction or a tangential direction to be within +/−5 μm.

9. The method for assembling a lens assembly according to claim 1, wherein the matching the actually measured image plane and the target plane comprises:
moving the first lens subassembly and the second lens subassembly relatively along the optical axis and stopping at the actually measured position;
acquiring the actually measured field curvature of the optical system at the actually measured position; and
determining whether the actually measured field curvature at the current actually measured position matches the target field curvature, if yes, proceeding to the connecting the first lens subassembly and the second lens subassembly, and if not, repeating the moving the first lens subassembly and the second lens subassembly relatively along the optical axis, and the acquiring the actually measured field curvature of the optical system until the actually measured field curvature at the current actually measured position matches the target field curvature.

10. The method for assembling a lens assembly according to claim 9, wherein before the moving the first lens subassembly and the second lens subassembly relatively along the optical axis, the method further comprises:
moving an object side target or an image side target along the optical axis to enable a clear imaging of the optical system.

11. The method for assembling a lens assembly according to claim 1, wherein the connecting the first lens subassembly and the second lens subassembly is performed by bonding or welding, and the welding comprises laser welding or ultrasonic welding.

* * * * *